(12) United States Patent
Takahashi et al.

(10) Patent No.: US 10,876,911 B2
(45) Date of Patent: Dec. 29, 2020

(54) DYNAMOMETER DEVICE

(71) Applicant: MEIDENSHA CORPORATION, Tokyo (JP)

(72) Inventors: Toshimichi Takahashi, Ota (JP); Yoshinori Fujimoto, Kiryu (JP); Yuki Ugamochi, Fukaya (JP); Nobuo Okazaki, Hachioji (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 16/608,313

(22) PCT Filed: Apr. 6, 2018

(86) PCT No.: PCT/JP2018/014655
§ 371 (c)(1),
(2) Date: Oct. 25, 2019

(87) PCT Pub. No.: WO2018/198717
PCT Pub. Date: Nov. 1, 2018

(65) Prior Publication Data
US 2020/0340872 A1 Oct. 29, 2020

(30) Foreign Application Priority Data
Apr. 26, 2017 (JP) .................. 2017-086745

(51) Int. Cl.
*G01L 3/16* (2006.01)
*G01L 3/02* (2006.01)

(52) U.S. Cl.
CPC . *G01L 3/16* (2013.01); *G01L 3/02* (2013.01)

(58) Field of Classification Search
CPC .................................. G01L 3/02; G01L 3/16
See application file for complete search history.

(56) References Cited

U.S. PATENT DOCUMENTS

| 4,092,855 A | * | 6/1978 | Kinney | ..................... G01L 3/18 |
| | | | | 73/862.09 |
| 4,199,979 A | * | 4/1980 | Herr, Jr. | ..................... F16D 1/10 |
| | | | | 73/116.05 |
| 2015/0107372 A1 | | 4/2015 | Olex et al. | |

FOREIGN PATENT DOCUMENTS

| JP | 55-58429 A | 5/1980 |
| JP | 6-109597 A | 4/1994 |
| JP | 2009-109309 A | 5/2009 |
| JP | 2010-2296 A | 1/2010 |
| JP | 2011-112372 A | 6/2011 |
| JP | 2012-88209 A | 5/2012 |

* cited by examiner

*Primary Examiner* — Herbert K Roberts
*Assistant Examiner* — John M Royston
(74) *Attorney, Agent, or Firm* — Foley & Lardner LLP (57) ABSTRACT

A dynamometer device (1) is equipped at a tip end part of a dynamometer (3) with a cover (5) that covers the periphery of a torque meter (14). The cover (5) is formed on its side surface with an opening section (41) that is equipped with a door (42), and a rotation shaft is locked by inserting a locking plate (52) through this opening section (41). The locking plate (52) is slidably guided by a guide rail section. A part of an outer peripheral surface of the rotation shaft is provided with a surface to be locked that is along the tangential direction, and the rotation shaft is locked by engaging the locking surface (64) of the locking plate (52).

20 Claims, 9 Drawing Sheets

DYNAMOMETER DEVICE

TECHNICAL FIELD

The present invention relates to a dynamometer device that conducts performance evaluation or test of a vehicular power train or engine. In particular, it relates to an improvement of a dynamometer device equipped with a locking mechanism that locks the rotation shaft of the dynamometer in the rotational direction when attaching and detaching the test piece.

BACKGROUND ART

There is known a dynamometer device that conducts performance evaluation or test by using a vehicular power train, engine alone, or transmission as a test piece. This dynamometer device is configured such that a rotation shaft on the test piece side, such as a drive shaft of transmission or a crankshaft of engine, is connected to a tip end of the rotation shaft of the dynamometer.

In such dynamometer device, working efficiency is low due to a free rotation of the rotation shaft of the dynamometer when attaching or detaching the test piece. In case that the dynamometer device is equipped with a brake mechanism such as disk brake, it is possible to lock the rotation shaft by actuating this brake mechanism. In the case of not being equipped with a brake mechanism, it has been necessary to conduct an operation for attaching the test piece, while limiting rotation of the rotation shaft of the dynamometer by using a tool such as wrench.

Patent Publication 1 discloses a locking member for locking by a bolt connection with a flange of the rotation shaft, in a locking mechanism to conduct calibration of the torque meter.

However, the locking mechanism disclosed in Patent Publication 1 has a configuration that requires a cumbersome operation in which the locking member is attached by bolts when it is necessary to lock the rotation shaft and in which the locking member is detached by removing bolts when conducting test and measurement without locking the rotation shaft. Therefore, working efficiency is low. Furthermore, in case that, for example, a tip end part of the rotation shaft is covered with a cover, it becomes necessary to detach the cover, too. This is not preferable.

PRIOR ART PUBLICATIONS

Patent Publications

Patent Publication 1: JP Patent Application Publication 2009-109309

SUMMARY OF THE INVENTION

A dynamometer device according to the present invention is configured to comprise:

a dynamometer in which a tip end part of a rotation shaft has a test-piece connection section and projects from a housing;

a surface to be locked that is formed at a part of an outer peripheral surface of the rotation shaft into a flat surface along a tangential direction;

a guide rail section that is fixedly formed on a supporting base and extends in a tangential direction of the rotation shaft; and a locking plate that limits rotation of the rotation shaft by being inserted along the guide rail section and by being interposed between the guide rail section and the surface to be locked.

In such configuration, when the locking plate is inserted along the guide rail section at a rotational position where the surface to be locked of the rotation shaft becomes parallel with the guide rail section, the locking plate enters between the guide rail section supported on the supporting base and the straight surface to be locked, thereby locking the rotation shaft in the rotational direction. Therefore, in this locked condition, it is possible to easily attach and detach the test piece. Furthermore, it turns easily into an unlocked condition by pulling out the locking plate.

In a preferred mode of the present invention, it further comprises:

a cover that encloses a periphery of the tip end part of the rotation shaft; and an opening section that is provided at the cover on an extension line of the guide rail section, wherein the locking plate is inserted through the opening section.

For example, the rotation shaft is such that a torque meter is interposed between a main shaft on a side of the dynamometer and a rotation member that serves as the test-piece connection section, wherein the cover is a protective cover that covers a periphery of the torque meter.

The high-performance torque meter, which is used for dynamometer devices, is weak against external impact or the like. Therefore, in general, it is covered and protected with the protective cover. In the above mode, it is possible to easily insert and pull out the locking plate, that is, lock and unlock the rotation shaft, without taking off the cover to serve as the protective cover.

In a mode of the present invention, the rotation shaft is such that a torque meter is interposed between a main shaft on a side of the dynamometer and a rotation member that serves as the test-piece connection section, wherein the surface to be locked is provided at a position that is away from the torque meter toward a side of the dynamometer.

That is, the main shaft side of the dynamometer is fixed in the rotational direction, not through the torque meter.

In a preferred mode of the present invention, the cover is equipped with a door that openably covers the opening section. Therefore, during operation such as test or measurement, it is possible to avoid foreign substance penetration or the like through the opening section.

In a preferred embodiment, the locking plate comprises:

a base section that has a width to be capable of maintaining the locking plate in an upright condition and slides along the guide rail section; and a plate section that rises from the base section along a plane perpendicular to an axis of the rotation shaft and is formed at an upper periphery with a locking surface to be in contact with the surface to be locked.

In this configuration, the locking plate itself maintains an upright condition. Therefore, it is possible for an operator to easily insert and pull out the locking plate.

In a more preferred mode, the plate section comprises:

a main section that is fixed to the base section and is equipped with a handle section; and a tip section that is detachably attached to a top surface of the main section through a screw member and has the locking surface, wherein a gap adjusting shim is inserted at a boundary surface between the main section and the tip section.

Therefore, it becomes possible to adjust the gap, which is generated between the surface to be locked and the locking surface, by replacing the shim(s) or changing the number of those.

More preferably, the guide rail section is formed at a tip end section in an insertion direction with a stopper that positions the locking plate at a position of an engagement with the surface to be locked. Therefore, at its insertion, it is positioned at a predetermined position by simply pushing thereinto.

According to the present invention, it is possible to lock and unlock the rotation shaft of the dynamometer in the rotational direction by a very simple operation. Therefore, it becomes possible to easily attach and detach the test piece.

MODE FOR IMPLEMENTING THE INVENTION

In the following, an embodiment of the present invention is explained in detail with reference to the drawings.

Figure 1:
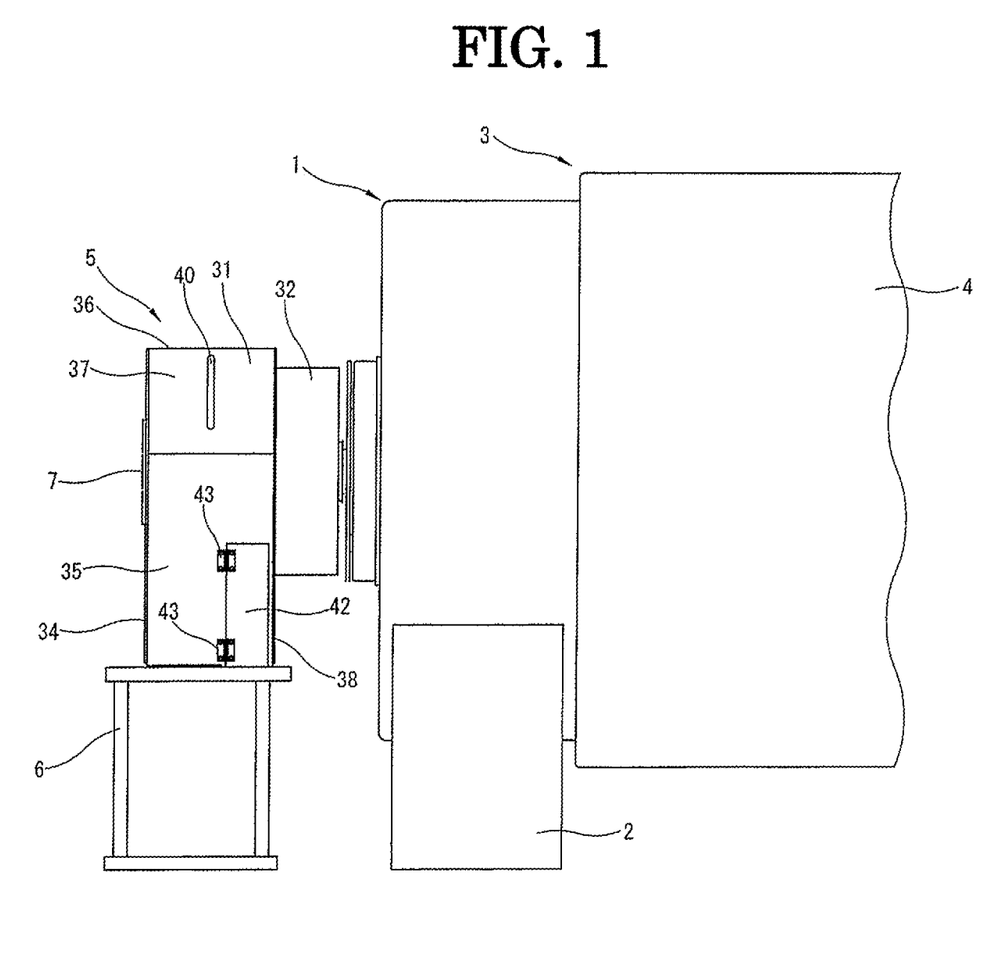
FIG. 1 is a side view of a front end section of a dynamometer device according to an embodiment of the present invention.
Figure 2:
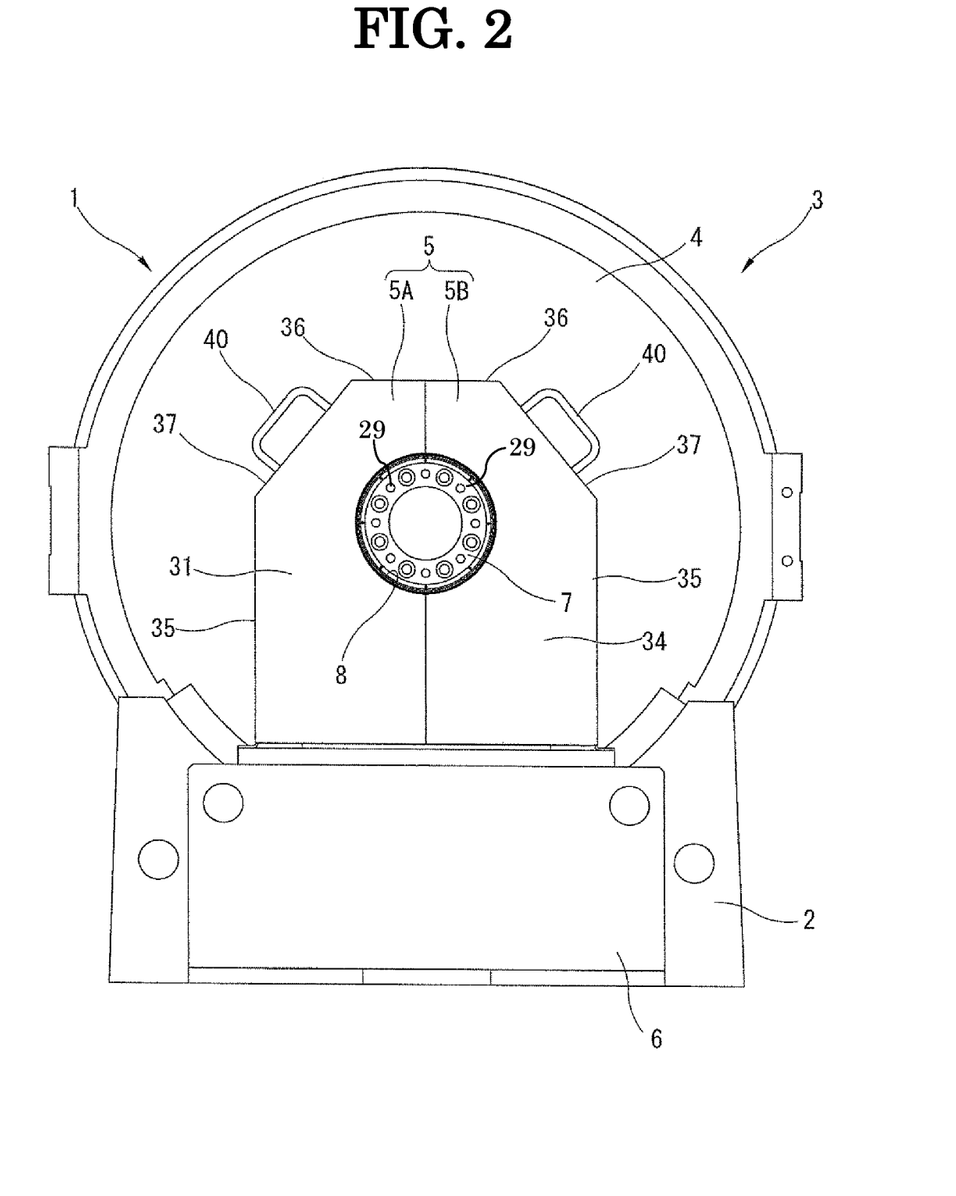
FIG. 2 is a front view of the dynamometer device according to the embodiment of the present invention.
Figure 3:
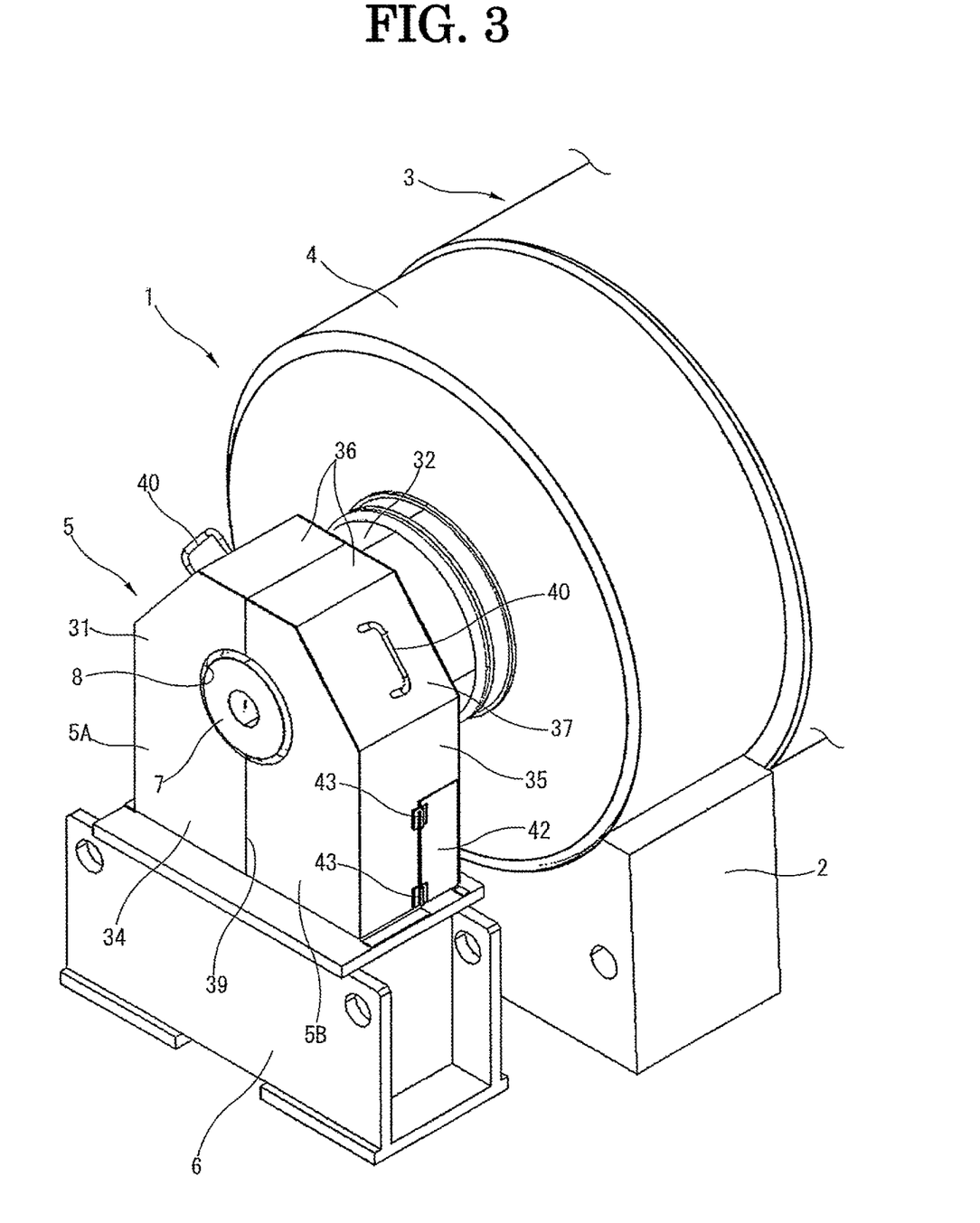
FIG. 3 is a perspective view of the front end section of the dynamometer device according to the embodiment of the present invention.

FIG. 1 to FIG. 3 show an embodiment of a dynamometer device 1 according to the present invention. The dynamometer device 1 is equipped with a dynamometer 3 that is mounted on a base 2 with a position to make the rotation axis horizontal. A tip end section of the rotation shaft of this dynamometer 3 projects from the front end surface of a housing 4 of the dynamometer. To cover this projecting part, there is provided a cover to serve as a protective cover. The cover 5 is supported on the top surface of a supporting base 6. A tip end surface of the rotation shaft serves as a test-piece connection section 7 for attaching a test piece, not shown in the drawings, directly or through a suitable jig, and, as shown in FIG. 2, is exposed to the outside through a circular opening section 8 provided at the front surface of the cover 5. FIG. 1 and FIG. 3 show only a front end section of the dynamometer device 1 that is equipped with the cover 5.

Figure 4:
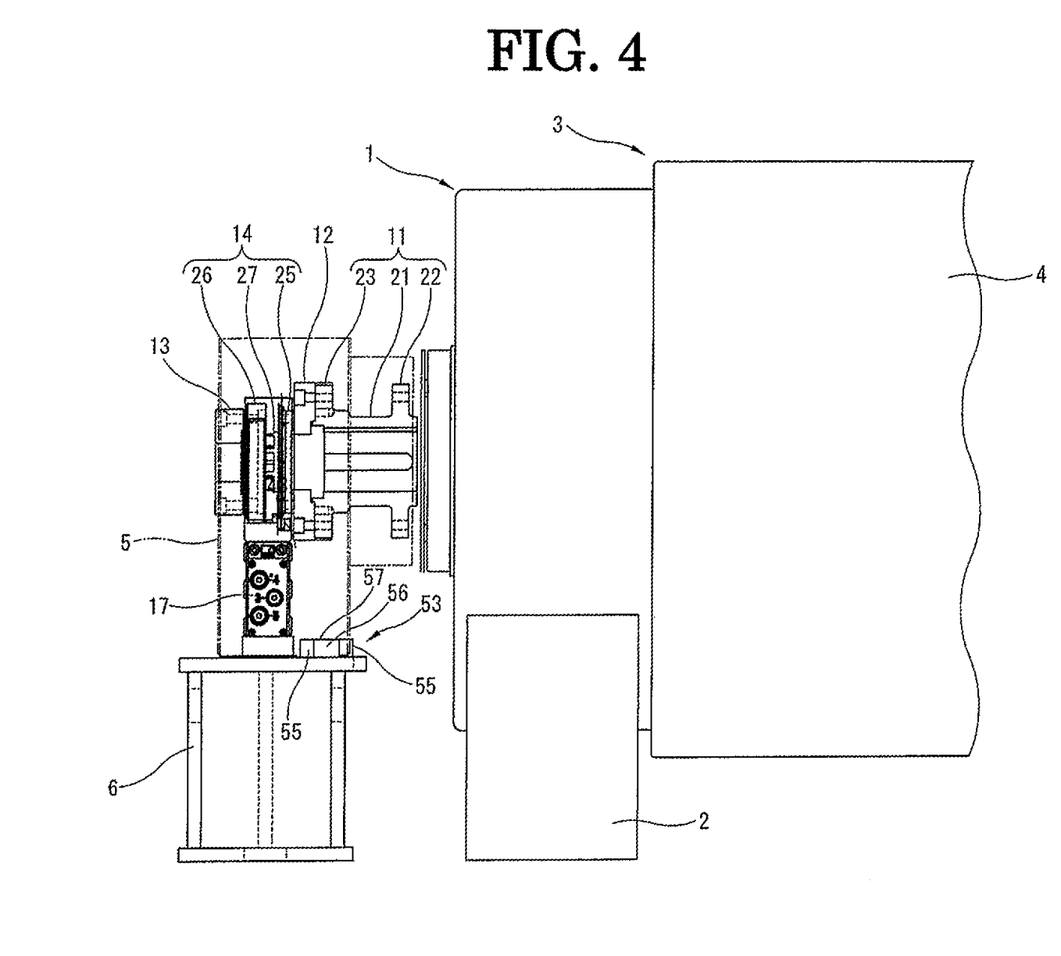
FIG. 4 is a side view of the front end section of the dynamometer, which is shown after removing the cover.
Figure 5:
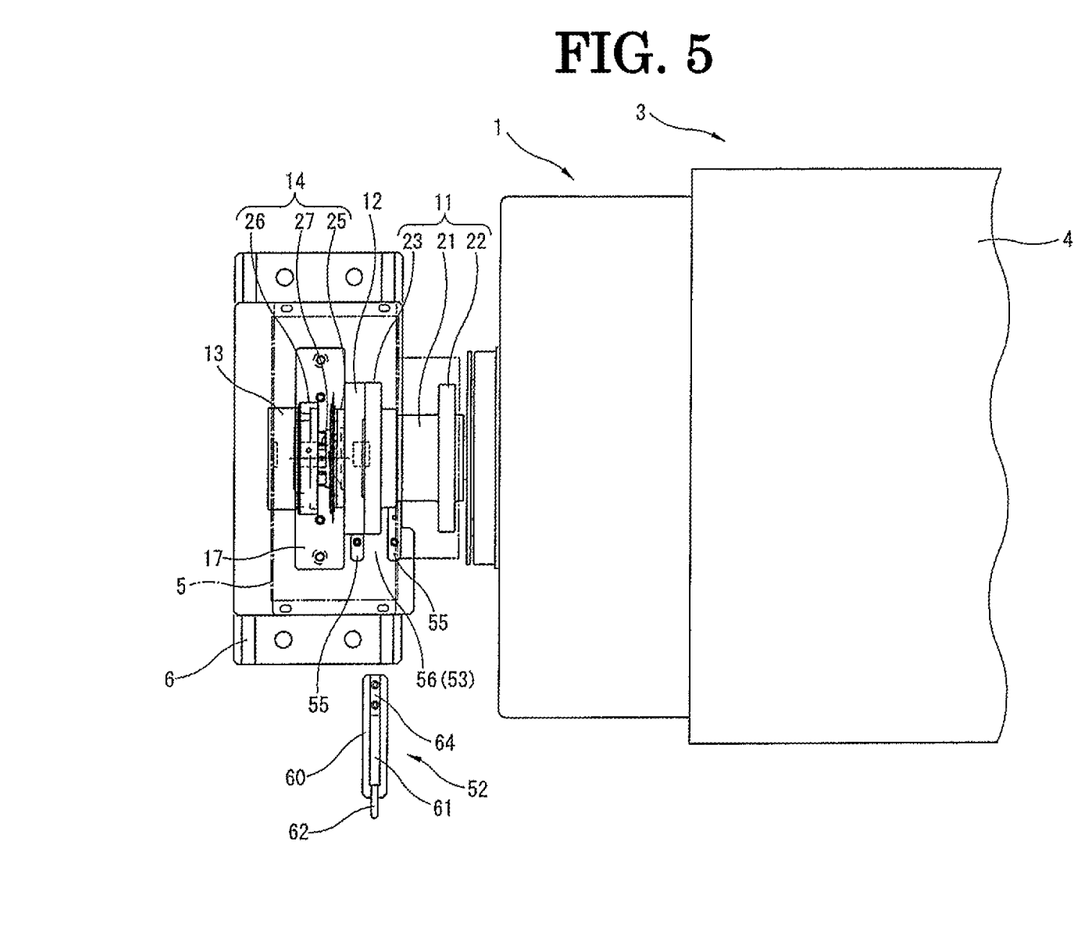
FIG. 5 is a plan view of the front end section of the dynamometer, which is shown after removing the cover.

FIG. 4 and FIG. 5 show a configuration of the rotation shaft tip end part after removing the cover 5. As shown in the drawing, the rotation shaft tip end part has a configuration in which a plurality of rotational members are coupled in the form of flange coupling in the axial direction. Specifically, the rotation shaft tip end part projecting from the housing 4 is equipped with a coupling 11 that serves as a main shaft attached to a tip end of a rotation shaft of an electric motor, a disk-shaped adapter flange 12 attached to this coupling 11, a disk-shaped coupling flange 13 constituting a test-piece connection section, and a torque meter disposed between the adapter flange 12 and the coupling flange 13.

At a position below the torque meter 14, there is disposed a stator section 17 that receives the detect signal by a radio transmission from the torque meter 14 and outputs to an outside operation measurement unit (computer). This stator section 17 has a configuration to surround a part of the peripheral surface of the torque meter 14 and is supported on the supporting base 6.

The coupling 11 is equipped with a cylindrical section 21 that is fitted at its inner peripheral surface to the rotation shaft of the electric motor to achieve a key coupling, a disk-shaped first flange section 22 that is formed at one end of this cylindrical section 21 toward the housing 4, and a disk-shaped second flange section 23 formed at the other end.

The adapter flange 12 is formed into a ring shape with a circular opening section at the center. This adapter flange 12 is adjacent to the second flange section 23 of the coupling 11, and both of them are joined to each other by a plurality of bolts in the axial direction, not shown in the drawings, that are equidistantly disposed at the outer peripheral section along the circumferential direction.

The torque meter 14 is a noncontact flange-type torque meter. It is equipped with a disk-shaped first flange 25 that is fixed to the adapter flange 12 by a plurality of bolts (not shown in the drawings) in the axial direction, a disk-shaped second flange 26 that is fixed to the coupling flange 13 by a plurality of bolts (not shown in the drawings) in the axial direction, and a sensor section 27 therebetween. The sensor section 27 detects torque acting between the first flange 25 and the second flange 26, and outputs the detect signal to the stator section 17 in the noncontact form.

The coupling flange 13 is formed into a ring shape with a circular opening at the center, and its surface opposite to the torque meter 14 serves as the test-piece connection section 7. This surface serving as the test-piece connection section 7 is provided with a plurality of threaded holes 29 (see FIG. 2) for fixing the test piece, not shown in the drawings, directly or through a suitable jig.

As shown in FIG. 1 to FIG. 5, the cover 5 is equipped with a box-shape section 31 on the supporting base 6 that surrounds a periphery of a range having a length from the vicinity of the second flange 23 of the coupling 11 to the vicinity of the tip end surface (test-piece connection section 7) of the coupling flange 13, and a cylindrical section 32 that extends in a cylindrical shape from the back surface of this box-shape section 31 toward the front end surface of the housing 4. A part of the vicinity of the first flange section 22 of the coupling 11 is covered with the cylindrical section 32. These box-shape section 31 and cylindrical section 32 are constituted of a metal plate of a suitable material.

The box-shape section 31 is formed into a deformed box-shape such as that prepared by making two corner sections of a rectangular solid into inclined surfaces of about 45 degrees. Specifically, the box-shape section 31 is constituted of a front surface wall 34 with the above-mentioned circular opening section 8, a pair of side walls 35, an upper wall 36 along a horizontal surface of the top surface, a pair of inclined walls 37 that connect left and right ends of the upper wall 36 and the top ends of the side walls 35, and a back surface wall 38 to which the cylindrical section 32 has been attached. The torque meter 14 together with the stator section 17 is received in the box-shape section 31. Therefore, the cover 5 functions as a protective cover for protecting the torque meter 14 against an unintentional contact with other parts, etc.

In the embodiment shown by the drawings, the cover 5 as a whole containing the box-shape section 31 and the cylindrical section 32 is constituted of two halves, that is, left and right constituent elements 5A, 5B separated at a separation surface 39 passing through the center. The pair of the inclined walls 37 is formed with generally U-shaped handles 40 for holding the separated constituent elements 5A, 5B removed from the supporting base 6.

Figure 8:
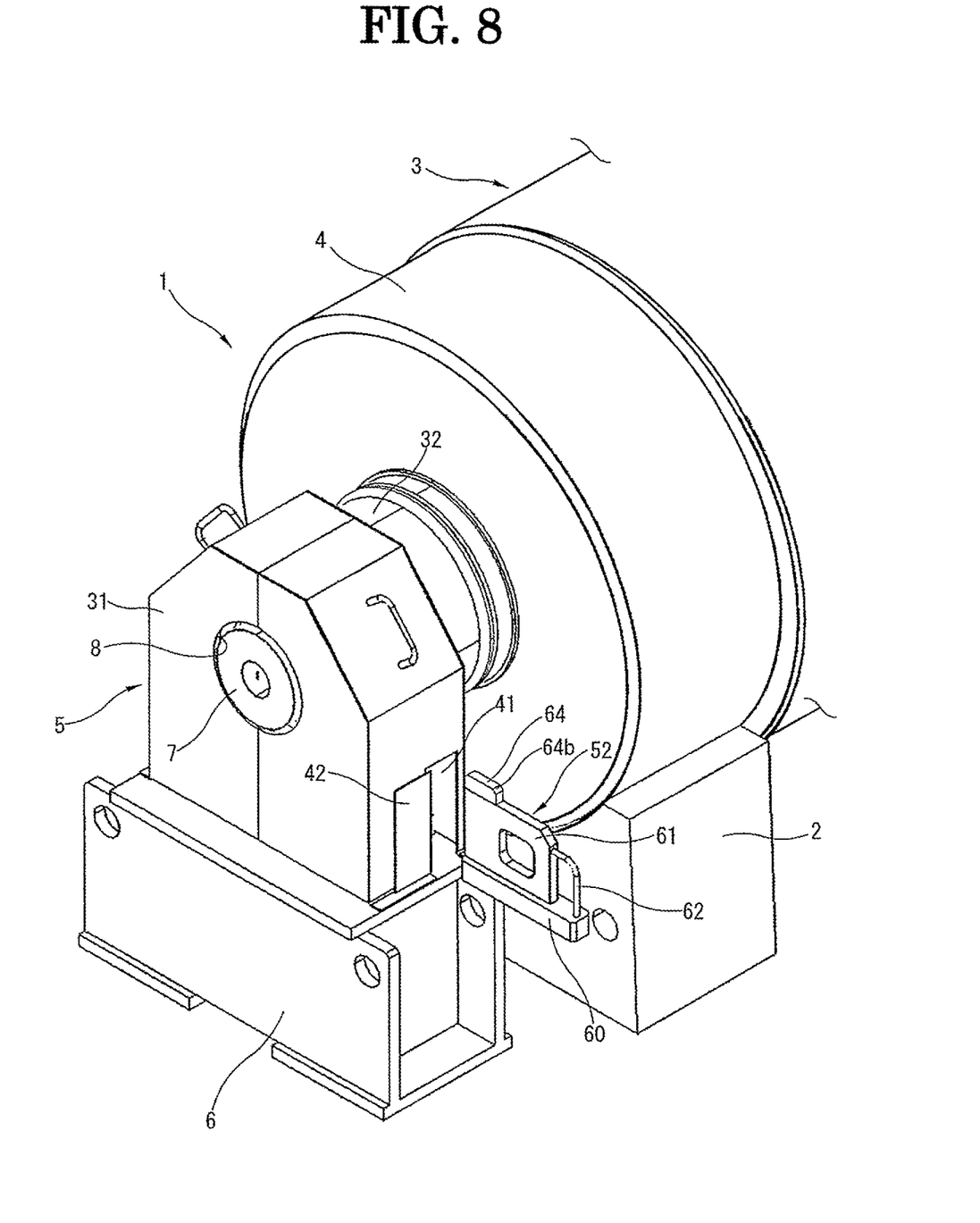
FIG. 8 is a perspective view of an essential section including the locking mechanism.

Herein, at a backward part of a lower portion of one side wall 35, there is formed an opening section 41 having a rectangular shape that is vertically elongated (see FIG. 8), to correspond to the after-mentioned locking mechanism. This opening section 41 is equipped with a platy door 42 that openably covers the opening section 41 from outside. The door 42 is swingably supported by hinges 43 (see FIG. 3) having a rotation axis along a side periphery on the front side of the opening section 41. It is preferable that the door 42 is configured to maintain its position at the closed position to cover the opening section 41 by a latch mechanism using, for example, a permanent magnet, etc.

Figure 6:
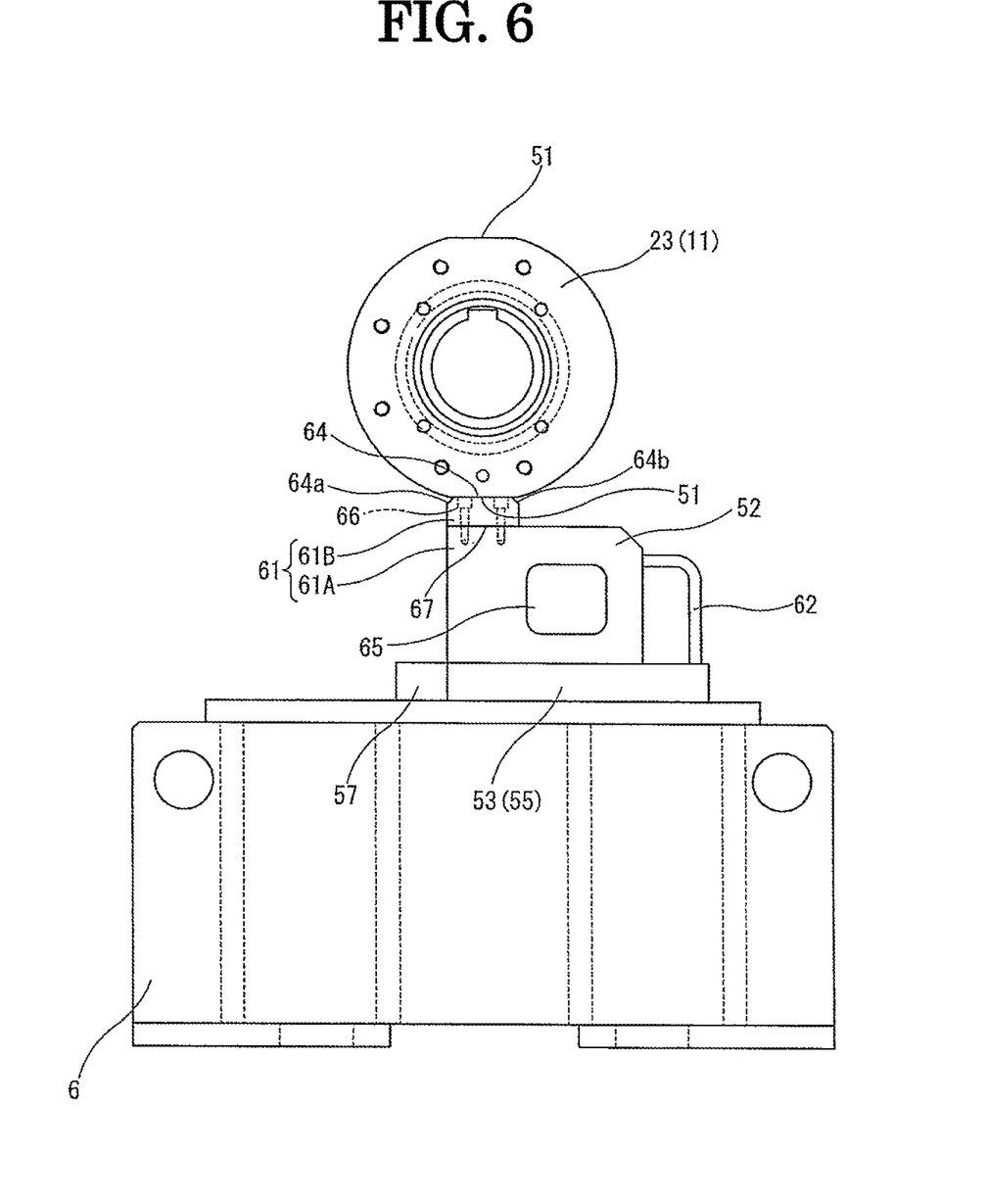
FIG. 6 is a front view of the locking mechanism, which is shown after removing other parts.
Figure 7:
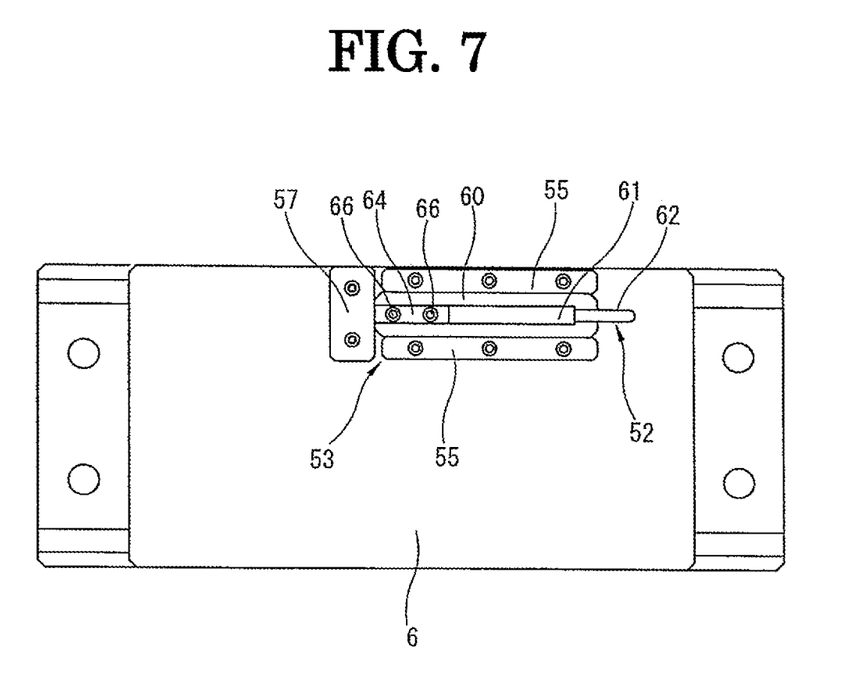
FIG. 7 is a plan view of the locking mechanism, which is shown after removing other parts.
Figure 9:
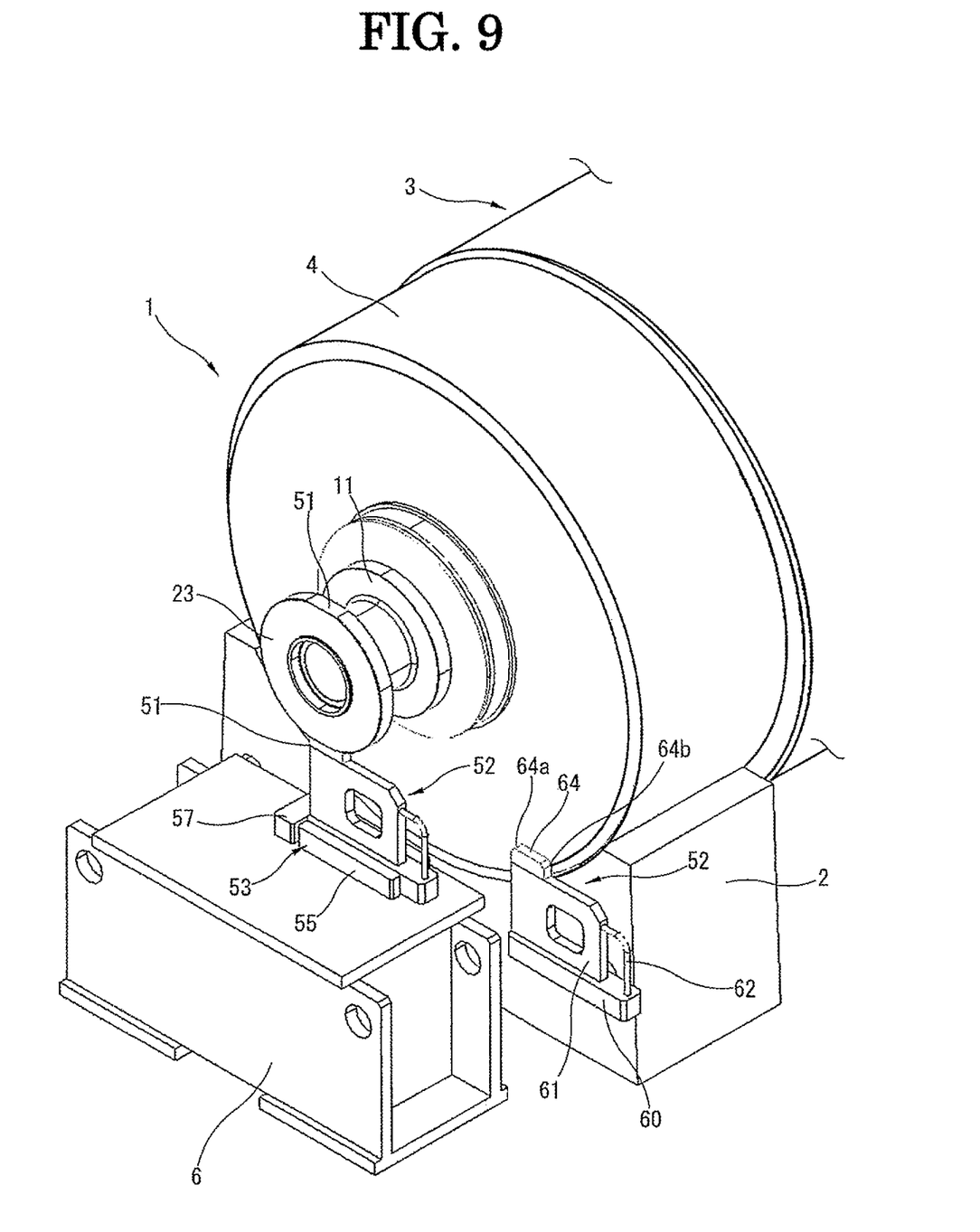
FIG. 9 is a perspective view of the locking mechanism, which is shown after removing the cover.

Next, the locking mechanism as an essential section of the present invention is explained with reference to FIG. 6 to FIG. 9. The locking mechanism is mainly constituted of a pair of surfaces 51 to be locked, which are formed on the second flange section 23 of the coupling 11, a locking plate 52 that is inserted through the opening section 41 of the cover 5, and a guide rail section 53 that guides this locking plate 52 on the supporting base 6. FIG. 6 and FIG. 9 are those showing constituent elements of the locking mechanism after removing parts other than the locking mechanism. FIG. 7 shows that after further removing the coupling 11, too.

As shown in FIG. 6 and FIG. 9, the second flange section 23 of the coupling 11 is provided with the surfaces 51 to be locked, each being prepared by making a part of the outer peripheral surface into a flat surface along the tangential direction. In the embodiment shown by the drawings, the surfaces 51 to be locked as a pair are formed at positions away from each other by 180 degrees in order to suppress unbalance at high-speed rotation. It suffices to provide at least one surface 51 to be locked. Furthermore, it is also possible to provide a plurality of the surfaces 51 to be locked, such as three or four of them, at equal angle intervals.

The guide rail section 53 is provided at a position corresponding to the position of the surface 51 to be locked, that is, the second flange section 23 of the coupling 11, as a position in the axial direction of the dynamometer 3. In other words, it is positioned directly below the second flange section 23. In the embodiment shown by the drawings, as shown in FIG. 7, the guide rail section 53 is constituted of a pair of rail members 55 that have a rod-shape with a rectangular section and are attached to the top surface of the supporting base to be parallel with each other, and a stopper member 57 that is attached to the supporting base 6 to close a tip end of a guide groove section 56 formed between the rail members 55 as a pair. That is, the guide groove section 56 is formed by utilizing the top surface of the supporting base 6 with a flat surface. This guide groove section 56 is formed into a straight line along a plane perpendicular to the rotation axis of the dynamometer 3. Furthermore, it extends along the tangential direction of the rotation shaft of the dynamometer 3. The opening section 41 of the above-mentioned cover 5 is positioned on an extension line of the guide groove section 56 (in detail, on extension line on an open side free from the stopper member 57). The guide groove section 56 extends at least to a position slightly exceeding directly below the rotational axis of the dynamometer 3. In other words, the stopper member 57 is disposed at a position where the guide groove section 56 extending from the side of the opening section 41 exceeds directly below of the rotation axis of the dynamometer 3. A tip end section of each rail member 55 that constitutes an opening end of the guide groove 56 is subjected at its corner sections to C-chamfering process such that the locking plate 52 is smoothly insertable.

The guide rail section is not limited to the configuration of the above-mentioned embodiment, as long as it has a configuration capable of guiding the locking plate 52 to be movable straight.

As shown in FIG. 6 and FIG. 9, the locking plate 52 is equipped with a base section 60 formed into a rod shape with a rectangular section having a width such that it is slidably fit into the guide groove section 56, a plate section 61 that rises from this base section 60 along a plane perpendicular to the rotation axis of the dynamometer 3, and a handle section 62 that is formed into a generally L-shape to extend between one end of this plate section 61 and the top surface of an end portion of the base section 60.

The base section 60 has an elongated bottom surface with a width corresponding to the guide groove section 56, and this bottom surface has a width to be capable of maintaining the locking plate in an upright condition. That is, the locking plate 52 is capable of standing by itself when it is placed on the top surface of the supporting base 6. Therefore, it is easily engaged into the guide groove section 56 between the rail members 55 as a pair by pushing it in an upright condition. When engaged into the guide groove section 56, both side surfaces of the base section 60 are in contact with inner surfaces of the rail members 55. Therefore, the upright condition of the locking plate 52 is more securely maintained.

The plate section 61 is equipped at an upper edge of a tip end section on the opposite side of the handle section 62 with a locking surface 64 to be in contact with the surface 51 to be locked. In the embodiment shown by the drawings, the locking surface 64 of a length that is almost identical with the length (length along chord) of the surface 51 to be locked is formed into a one-step higher form. This locking surface 64 is formed into a flat surface corresponding to the surface 51 to be locked such that a surface contact with the surface 51 to be locked becomes possible. Furthermore, corner portions at both ends of the locking surface 64 are formed into inclined surface 64a, 64b obliquely chamfered. When the locking plate 52 inserted along the guide groove section 56 is positioned by an abutment with the stopper member 57, the locking surface 64 is positioned directly below the rotation axis. The bottom surface of the base section 60 and the locking surface 64 are parallel with each other.

In detail, the plate section 61 is constituted of two members, a rectangular main section 61A that is fixed to the base section 60 and is connected to the handle section 62, and a tip section 61B that is detachably fixed to the flat top surface of this main section 61A by a pair of bolts 66. The locking surface 64 is formed at an upper periphery of the tip section 61B. The tip section 61B is constituted of a metal, such as brass, that is softer than a steel material constituting the coupling 11 having the surface 51 to be locked. With this, when it hits against the peripheral surface of the coupling 11 during the locking operation, the side of the tip section 61B deforms to prevent damage and deformation on the side of the coupling 11.

Furthermore, a gap adjusting shim (a thin metal plate) not shown in the drawings is inserted at a boundary surface 67 between the tip section 61B that is detachably attached and the main section 61A. Therefore, it is possible to adjust the distance between the bottom surface of the base section 60 and the locking surface 64 by replacing with a shim having a different thickness or changing the number of shims to be inserted. That is, it is possible in the locked condition to adjust the gap remaining between the surface 51 to be locked and the locking surface 64 to an optimum amount.

The plate section 61 (main section 61A) is equipped with a window-shaped opening section 65 for weight reduction. This opening section 65 is provided at a position away from directly below the locking surface 64 that becomes a load transmission pathway.

The handle section 62 is constituted in a shape prepared by curving a round rod to have a generally L-shape such that an operator can lift the locking plate 52 and that an operator can hold it when taking it into or out through the opening section 41 of the cover 5. In the embodiment shown in the drawings, it is configured that the entirety of the locking plate 52 including the handle section 62 is in the cover 5 in a condition in which the locking plate 52 has been inserted into the guide rail section 53 (in a position where it has been brought into abutment with the stopper member 57) (in other words, the door 42 can be closed). However, it may be configured that the handle section 62 projects from the opening section 41 in a condition in which the locking plate 52 has been inserted.

In the dynamometer device 1 of the embodiment equipped with the above-configured locking mechanism, for example, when connecting or disconnecting the rotation shaft on the test-piece side, it is possible to easily lock the rotation shaft of the dynamometer 3 in the rotational direction by utilizing the locking mechanism. Specifically, the door 42 covering the opening section 41 of the cover 5 is opened, and the locking plate 52 is inserted from here as shown in FIG. 9. In FIG. 9, the locking plate 52 is shown at two positions before and after the insertion.

The locking plate 52 can be inserted by placing a tip end section of the base section 60 inserted through the opening section 41 on the top surface of the supporting base 6 and pushing it toward the guide rail section 53. If the rotation shaft stops with a posture that the surface 51 to be locked on the rotation shaft side faces downward, the locking surface 64 of the locking plate 52 is naturally brought into engagement with the surface 51 to be locked. If the rotational position of the rotation shaft is not at a predetermined position, for example, it is possible to rotate the test-piece connection section 7 of the rotation shaft tip end by fingers to mate the surface 51 to be locked with the locking surface. This makes it possible to achieve their engagement. Since the locking surface 64 is formed at its end section with the inclined surface 64a, a smooth engagement is possible. If the locking plate 52 is pushed to a position where the locking plate 52 is restricted by the stopper member 57, the locking plate 52 is turned into a condition where the locking plate 52 is interposed between the surface 51 to be locked and the guide groove section 56 (the top surface of the supporting base). This makes the rotation of the rotation shaft impossible, and the rotation shaft is locked in the rotational direction.

Furthermore, in this locked condition, the base section 60 has a relatively wide width and is sandwiched between the rail members 55 as a pair. With this, the locking plate 52 is maintained in a standing condition and does not fall in the axial direction of the rotation axis. Therefore, it is not necessary to have a bolt fixing or the like, and the locking can easily be achieved only by the insertion operation of the locking plate 52.

In the above-mentioned embodiment, the locking of this rotation shaft is conducted against the coupling 11 which is away from the torque meter 14 toward the electric motor. That is, the rotation shaft of the electric motor is directly fixed, not through the torque meter 14. This makes it possible to achieve a rigid fixing. Furthermore, the load along the rotation shaft radius direction to be generated by the engagement of the locking plate 52 does not act on the torque meter 14, thereby causing no risk to damage the torque meter 14 of high precision.

Next, when releasing the locking after completion of the test-piece connection or the like, it suffices to pull out the locking plate 52 through the opening section 41 of the cover 5. After pulling out the locking plate 52, the door 42 of the opening section 41 is closed. With this, it turns into a condition in which the periphery of the torque meter 14 is again surely protected by the cover 5.

In this way, in the above-mentioned embodiment, it is possible by the locking plate 52 to achieve and release the locking of the rotation shaft without removing the cover 5. As mentioned above, the cover 5 can be removed by separating it into two halves, when conducting maintenance or the like of the torque meter 14.

The invention claimed is:

1. A dynamometer device comprising:
a dynamometer in which a tip end part of a rotation shaft has a test-piece connection section and projects from a housing;
a surface to be locked that is formed at a part of an outer peripheral surface of the rotation shaft into a flat surface along a tangential direction;
a guide rail section that is fixedly formed on a supporting base and extends in a tangential direction of the rotation shaft; and
a locking plate that limits rotation of the rotation shaft by being inserted along the guide rail section and by being interposed between the guide rail section and the surface to be locked.

2. The dynamometer device as claimed in claim 1, wherein the dynamometer device further comprises:
a cover that encloses a periphery of the tip end part of the rotation shaft; and
an opening section that is provided at the cover on an extension line of the guide rail section,
wherein the locking plate is inserted through the opening section.

3. The dynamometer device as claimed in claim 2, wherein the rotation shaft is such that a torque meter is interposed between a main shaft on a side of the dynamometer and a rotation member that serves as the test-piece connection section,
wherein the cover is a protective cover that covers a periphery of the torque meter.

4. The dynamometer device as claimed in claim 1, wherein the rotation shaft is such that a torque meter is interposed between a main shaft on a side of the dynamometer and a rotation member that serves as the test-piece connection section, wherein the surface to be locked is provided at a position that is away from the torque meter toward a side of the dynamometer.

5. The dynamometer device as claimed in claim 4, wherein the dynamometer device further comprises:
a cover that encloses a periphery of the tip end part of the rotation shaft; and
an opening section that is provided at the cover on an extension line of the guide rail section,
wherein the locking plate is inserted through the opening section.

6. The dynamometer device as claimed in claim 2, wherein the cover is equipped with a door that openably covers the opening section.

7. The dynamometer device as claimed in claim 6, wherein the rotation shaft is such that a torque meter is interposed between a main shaft on a side of the dynamometer and a rotation member that serves as the test-piece connection section,
wherein the cover is a protective cover that covers a periphery of the torque meter.

8. The dynamometer device as claimed in claim 1, wherein the locking plate comprises:
a base section that has a width to be capable of maintaining the locking plate in an upright condition and slides along the guide rail section; and
a plate section that rises from the base section along a plane perpendicular to an axis of the rotation shaft and is formed at an upper periphery with a locking surface to be in contact with the surface to be locked.

9. The dynamometer device as claimed in claim 8, wherein the dynamometer device further comprises:
a cover that encloses a periphery of the tip end part of the rotation shaft; and
an opening section that is provided at the cover on an extension line of the guide rail section,
wherein the locking plate is inserted through the opening section.

10. The dynamometer device as claimed in claim 9, wherein the rotation shaft is such that a torque meter is interposed between a main shaft on a side of the dynamometer and a rotation member that serves as the test-piece connection section,
wherein the cover is a protective cover that covers a periphery of the torque meter.

11. The dynamometer device as claimed in claim 9, wherein the rotation shaft is such that a torque meter is interposed between a main shaft on a side of the dynamometer and a rotation member that serves as the test-piece connection section,
wherein the surface to be locked is provided at a position that is away from the torque meter toward a side of the dynamometer.

12. The dynamometer device as claimed in claim 8, wherein the plate section comprises:
a main section that is fixed to the base section and is equipped with a handle section; and
a tip section that is detachably attached to a top surface of the main section through a screw member and has the locking surface,
wherein a gap adjusting shim is inserted at a boundary surface between the main section and the tip section.

13. The dynamometer device as claimed in claim 12, wherein the dynamometer device further comprises:
a cover that encloses a periphery of the tip end part of the rotation shaft; and
an opening section that is provided at the cover on an extension line of the guide rail section,
wherein the locking plate is inserted through the opening section.

14. The dynamometer device as claimed in claim 1, wherein the guide rail section is formed at a tip end section in an insertion direction with a stopper that positions the locking plate at a position of an engagement with the surface to be locked.

15. The dynamometer device as claimed in claim 14, wherein the dynamometer device further comprises:
a cover that encloses a periphery of the tip end part of the rotation shaft; and
an opening section that is provided at the cover on an extension line of the guide rail section,
wherein the locking plate is inserted through the opening section.

16. The dynamometer device as claimed in claim 15, wherein the rotation shaft is such that a torque meter is interposed between a main shaft on a side of the dynamometer and a rotation member that serves as the test-piece connection section,
wherein the cover is a protective cover that covers a periphery of the torque meter.

17. The dynamometer device as claimed in claim 15, wherein the rotation shaft is such that a torque meter is interposed between a main shaft on a side of the dynamometer and a rotation member that serves as the test-piece connection section,
wherein the surface to be locked is provided at a position that is away from the torque meter toward a side of the dynamometer.

18. The dynamometer device as claimed in claim 15, wherein the locking plate comprises:
a base section that has a width to be capable of maintaining the locking plate in an upright condition and slides along the guide rail section; and
a plate section that rises from the base section along a plane perpendicular to an axis of the rotation shaft and is formed at an upper periphery with a locking surface to be in contact with the surface to be locked.

19. The dynamometer device as claimed in claim 18, wherein the plate section comprises:
a main section that is fixed to the base section and is equipped with a handle section; and
a tip section that is detachably attached to a top surface of the main section through a screw member and has the locking surface,
wherein a gap adjusting shim is inserted at a boundary surface between the main section and the tip section.

20. The dynamometer device as claimed in claim 18, wherein the rotation shaft is such that a torque meter is interposed between a main shaft on a side of the dynamometer and a rotation member that serves as the test-piece connection section,
wherein the cover is a protective cover that covers a periphery of the torque meter.

* * * * *